April 18, 1933.  V. VATH  1,904,840
SLICER
Filed Jan. 13, 1931   3 Sheets-Sheet 2
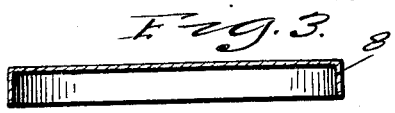
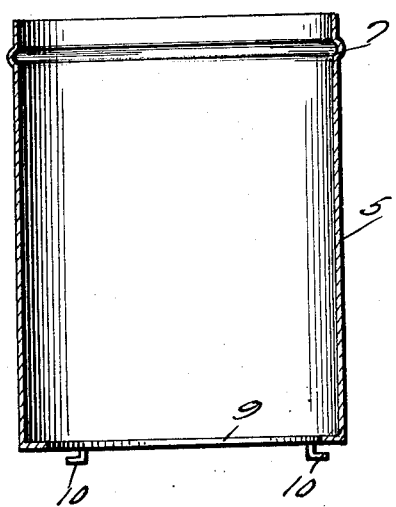
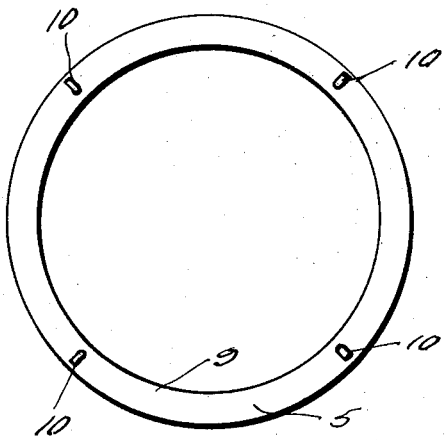
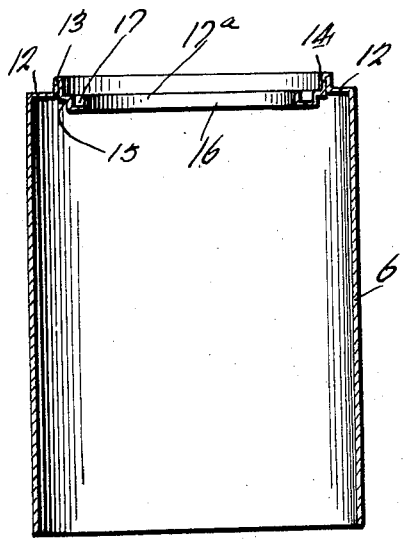
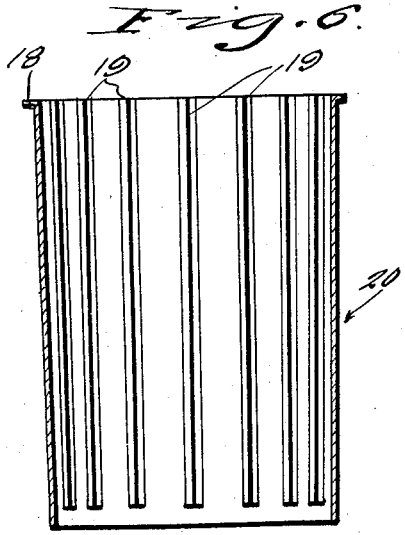
Inventor
Vera Vath
By Clarence A. O'Brien
Attorney April 18, 1933.　　　V. VATH　　　1,904,840
SLICER
Filed Jan. 13, 1931　　　3 Sheets-Sheet 3
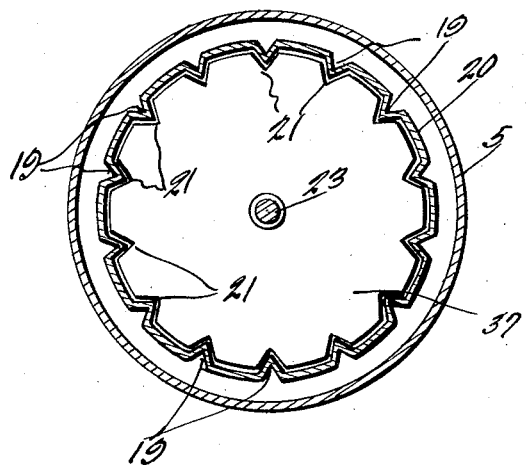
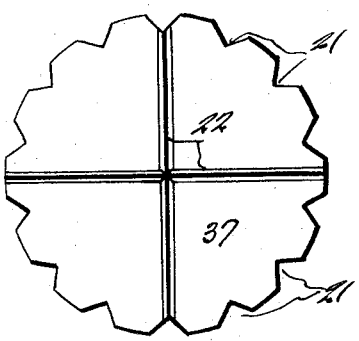
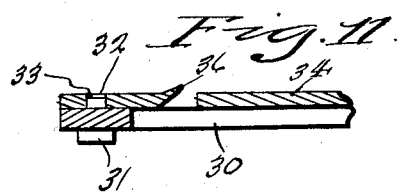
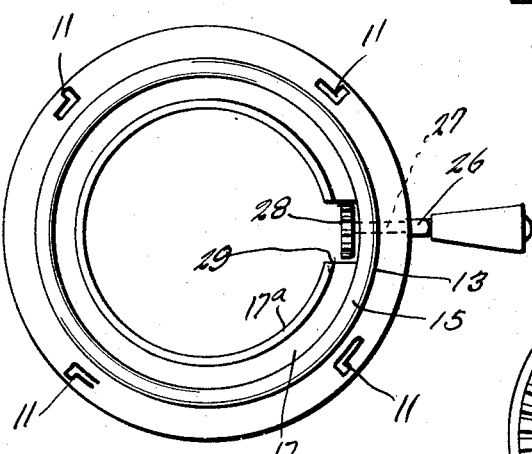
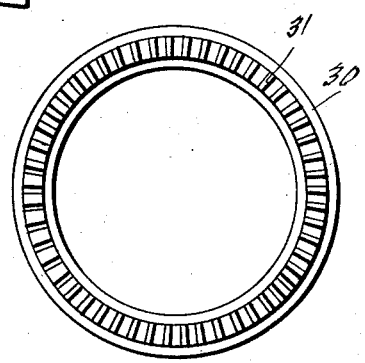
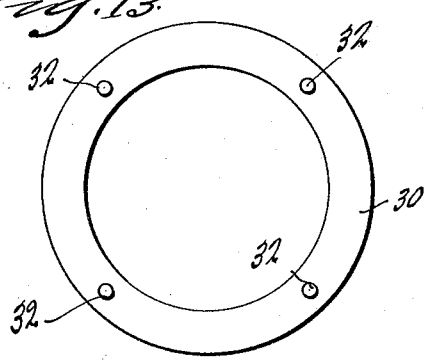
Inventor
Vera Vath
By Clarence A. O'Brien
Attorney Patented Apr. 18, 1933

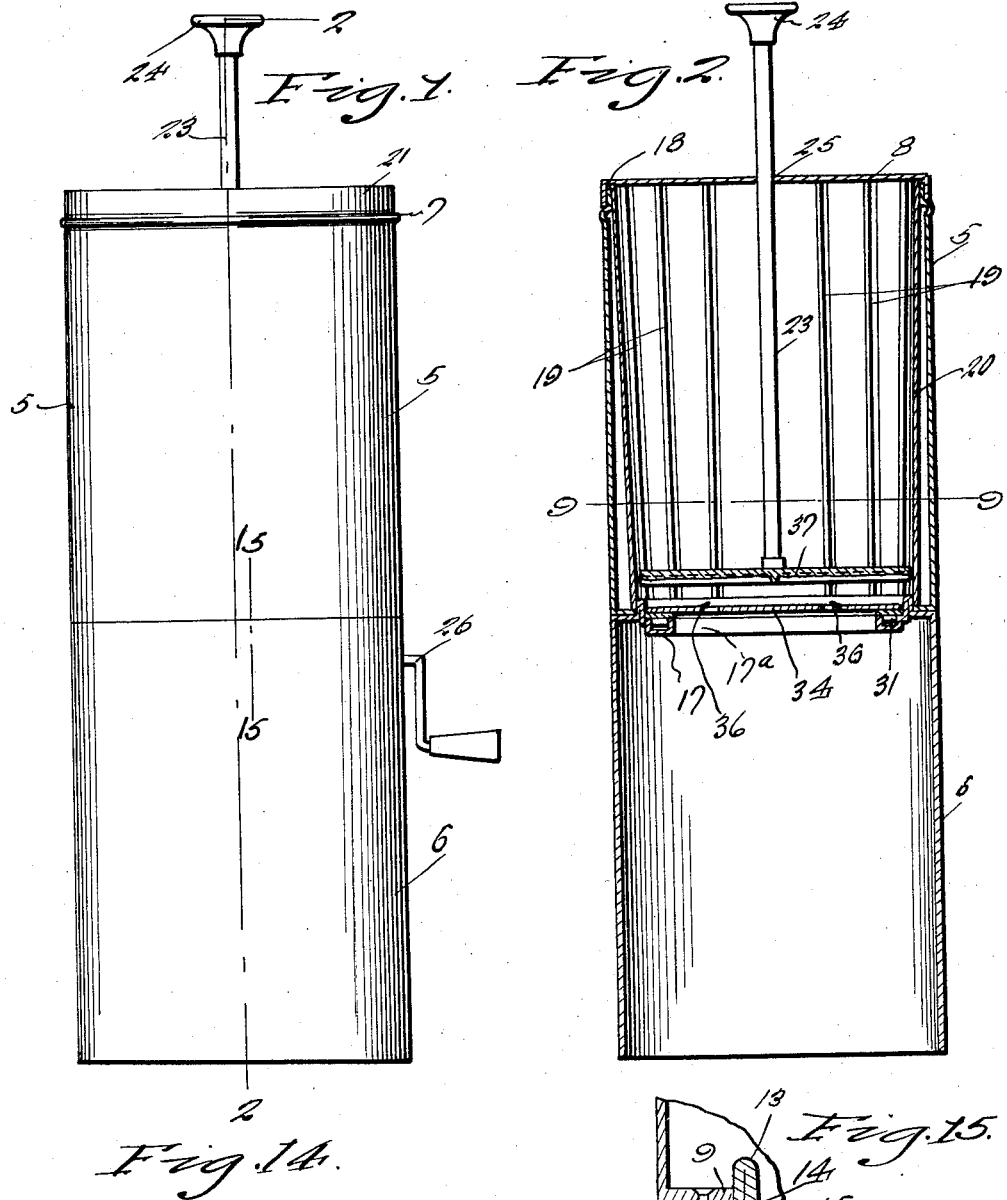

1,904,840

UNITED STATES PATENT OFFICE

VERA VATH, OF MINNEAPOLIS, MINNESOTA

SLICER

Application filed January 13, 1931. Serial No. 508,516.

This invention relates generally to apparatus for slicing fruits, vegetables, and the like in which the fruit or vegetables and the excretions therefrom are confined against accidental escape during the slicing operation.

It is well known that in the process of slicing fruits and vegetables having a great deal of the valuable essence of said fruits and vegetables escapes when no provision is made to confine the same, and a considerable waste and inconvenience results.

It is also well known in slicing such vegetables and fruits as onions and the like, that the eyes of the operator are affected thereby in an unpleasant manner.

These and other defects are done away with in the present invention, by the provision of an airtight receptacle for the fruits or vegetables constructed in association with a slicing knife of the rotary type, and having a closed means to deliver the sliced fruits or vegetables to the dish or the like provided for their reception.

The object of the invention is, therefore, to provide a device of this kind which is composed of a fruit or vegetable receiving receptacle and a delivery chamber disposed in vertical superposed manner, having a rotary slicer knife associated therebetween.

It is another object of the invention to provide a device of this kind having an airtight receiving receptacle and a closed delivery chamber to prevent the escape of fluid and gaseous excretions from the fruits or vegetables being sliced.

Another object of the invention is to provide a device of this kind which is more efficient than devices heretofore known and used for this purpose, or for the purpose stated, and which is simple and easy to manufacture at small cost.

It is another object of the invention to provide a device of this character which is simple and easy of operation and highly satisfactory for the purpose for which it is designed.

These and other and further objects, the nature of the invention, its composition, and arrangement and combination of parts, may be readily understood from a reading of the following descriptions of the drawings in which;—

Figure 1 is a side elevational view of the complete device.

Fig. 2 is a cross section of Fig. 1 on the line 2—2 of Fig. 1.

Fig. 3 is a vertical section through the cover provided for the receptacle.

Fig. 4 is a similar cross section through the receptacle.

Fig. 5 is a similar cross section through the delivery chamber.

Fig. 6 is a similar cross sectional view of the corrugated shell within the receptacle.

Fig. 7 is a bottom view of Fig. 4, and

Fig. 8 is a top view of Fig. 5.

Fig. 9 is a top view in cross section on the lines 9—9 of Fig. 2.

Fig 10 is a plan view of the tamper.

Fig. 11 is a detail cross section showing details of the knife.

Fig. 12 shows the knife operating cog wheel.

Fig. 13 is a reverse view of Fig. 12.

Fig. 14 is a plan view of the rotary cutting knife.

Fig. 15 is a detailed cross sectional view on the line 15—15 of Fig. 1.

It is to be understood that I do not wish to limit the application of this invention to the particular embodiment set forth herein in illustration thereof, and any changes may be made in materials or structure consistent with the scope and spirit of the invention.

Referring in detail to the drawings, I provide a closed upper receptacle 5 and a lower chamber 6. The upper end of the receptacle 5 is provided with a bead 7 for supporting the lower end of a closure cap 8 which fits snugly on its upper end. The bottom of the receptacle 5 is open and is provided with a right angularly inturned flange 9 and equidistantly spaced hooks 10 around the periphery thereof and intermediate the edges of said flange, for engaging in slots 11 in a similar flange 12 on the upper edge of the chamber 6.

The hooks 10 are mounted on the bottom of the flange 9 by any suitable means and comprise a dependent neck portion and a laterally directed portion to be turned and engaged in the slots 11 by pressing the receptacle upon the chamber in the required position and turning them relative to each other to a slight degree to lock the same in position. The flange 12 of the receptacle cup is of such a width as to accommodate the flange 9 and has an upwardly projecting U-shaped formation 13 which abuts the edge of the flange 9 and the U-shaped formation 13 has one leg longer than the other and said long leg 14 depending below the level of said flange 12 and having a horizontal inward projection 15 which carries a U-shaped channel member 16 having its opening 17 mounted upwardly as shown in Fig. 5. The bottom of the chamber 6 is entirely open as shown in Fig. 5.

Within the receptacle 5 is a removable corrugated cylindrical form having a closed cylindrical wall and its end open, and the upper of said ends larger than the other and provided with a lateral right angular flange as shown at 18, said member being generally designated by the numeral 20, and said corrugations 19 being formed in vertical spaced relation in the wall. The corrugated member 20 is adapted to have its flange 18, on the upper edge 21 of the receptacle 5 and to depend therein and engage about the element 13 and rest upon the flange 9 as illustrated in Fig. 2.

Adapted for reciprocatory motion within the member 20 is a tamp of circular form illustrated in Fig. 10 having notched ends for sliding register in the corrugations within the member 20 the notches being designated 21. A plurality of indentations forms channels 22 in right angular relationship and disposed on diameters of the under surface of the said tamp. The cooperation of said tamp and said corrugated shell 20 is disclosed in Fig. 9. For imparting up and down reciprocatory motion to said tamp there is provided a rod 23 provided with a finger grip 24 which rod is slidable through the cover 8 of the receptacle 5.

Referring to Fig. 8, the exact formation of the slots 11 will be seen and in this figure, I illustrate the attachment of the crank 26 and operating shaft 27, on the inner end of which is disposed a pinion 28, in an opening 29 cut in the channel 17 and its flange which is designated 17a.

A cog wheel 30 has teeth 31 downwardly depending, to mesh with the teeth of the pinion 28, whereby wheel 30 may be rotated by rotating the crank 26.

Referring to Fig. 13, it will be seen that the upper surface of the ring 30 is provided with pins 32 equally spaced from the periphery. Holes 33 are formed through a circular rotary cutting knife disk 34 approximately of the same diameter as the toothed ring 30 and provided with parallel transverse slots forming, substantially chords subtending equal arcs of the circumference of the disk and being formed parallel with each other slightly in staggered relation as shown in Fig. 14.

Referring to Figs. 11 and 14, it will be seen that the edges of the slots nearest the perimeter of the disk are turned as at 36 and sharpened to provide cutting blades. The disk 34 is attached upon the cog ring 30 as shown in Fig. 11 and is adapted to be rotated therewith by the turning of the crank 26. It is obvious that the upturned edge 36 will engage the vegetables or the like and within the receptacle which are thrust into contact therewith by the tamp designated 37 by means of the handle 23, the cover 8 having been set to close the top of the receptacle 5. The sliced vegetables or the like will pass through the aperture or slot 35 into the chamber 6 and from which it is delivered into a dish or other container as desired. The up and down tamping motion is provided by the handle 23 operating the tamp having the notches 21 cooperating with the corrugations 20 and thus thrusting all of the available vegetables or the like into position to be sliced or comminuted. It should be noted that the cog wheel 30 and its superposed knife 34 has a nailing post running contact with the wall 13 as illustrated in Fig. 2, in order to provide for uniform smooth rotation of the same. The cog teeth are so formed as to achieve a smooth running relationship within the channel 17 as shown in Fig. 2.

The operation of the device is thought to be obvious in that vegetables to be sliced are placed in the receptacle 5, the cover 8 and the tamp 37 having been withdrawn therefrom. The cover 8 and the tamp 37 are then replaced and pressure brought to bear upon the handle 23 to tamp the vegetables or the like into engagement with the knife 34, and this tamping action is continued as required during the rotation of the handle 26 which operates to rotate the blade 34 and to slice the said vegetables and to deliver the slices into the chamber 6 which may be disposed in a bowl, dish or other container as desired.

It will be obvious that I have provided a device of the character described, which is inexpensive to manufacture, simple in operation, and highly satisfactory for the purposes for which it is designed.

Having thus described my invention, what I claim as new is:

1. A fruit and vegetable slicer comprising an upper closed cylindrical casing mounted on a lower cylindrical casing and having open ends, a vertically corrugated shell within said upper casing, and a circular tamp having notches in its periphery to register with the corrugations in said shell, an operating rod for imparting motion to said tamp, and a cover for the upper end of said upper casing, and having an aperture at its center for receiving said operating means for the tamp, and inward extending flanges on the upper end of said lower casing adapted to support said upper casing and to provide an operating face, a circular rotatable slicing knife, a cog ring mounted on the lower face of said circular knife, and adapted to operate upon said flange, an operating handle having a crank at one end and a pinion at its other end adapted to cooperate with the cog ring to rotate the same.

2. A fruit and vegetable slicer comprising a vegetable and fruit receiving receptacle, a cover for the top of said receptacle and a tamp mounted in said receptacle for up and down reciprocation, a handle on said tamp, said cover having an aperture through which said handle operates, and a lower chamber adapted to support said upper receptacle, and said lower chamber having at its upper edges projecting flanges, a channel member of circular form supported on said flanges, and a circular cog ring having teeth on its lower side, said teeth disposed in said channel, said ring adapted to rotatably slide upon the edges of said channel, and a notch cut out of one side of said channel and flange, and a shaft journaled through the side of the chamber, a crank at its outer end, a pinion at its inner end adapted to engage the teeth of said circular cog ring, and a circular slicing knife mounted on the upper side of said cog ring for rotation therewith.

3. A fruit and vegetable slicer comprising a hollow cylindrical body comprising an upper material receiving casing and a lower cut material receiving casing separably connectible, a closure cap for the upper end of the upper casing, tamp means movable through the cap, an annular flange in the upper end of the lower casing, an annular channel carried by the flange, an annulus adapted to rest upon and rotate relative to the annular channel, teeth depending from the lower side of the annulus adapted to depend into the annular channel whereby the annular channels acts as a guide and bearing for the annulus, a slotted disk knife secured upon the upper side of the annulus, and manually operated pinion means extending through the side of the lower casing and operatively engaged with the teeth of the annulus through an opening in the channel for rotating the knife.

4. A fruit and vegetable slicer comprising a hollow cylindrical body comprising an upper material receiving casing and a lower cut material receiving casing separably connectible, tamp means vertically movable in the upper casing, an annular flange in the upper end of the lower casing, an annular channel carried by the flange, an annulus adapted to engage the upper side of and rotate relative to the annular channel, teeth depending from the lower side of the annulus into the annular channel whereby the channel acts as a guide and bearing for the annulus, a slotted disk knife secured upon the upper side of the annulus, and manually operated pinion means extending through the side of the lower casing and operatively engaged with the teeth of the annulus through an opening in the channel for rotating the knife, and downwardly converging wall means within the upper casing and surrounding the knife and having its lower end portion closely surrounding the tamp when the tamp is in depressed position for enabling the tamp means to positively convey and confine material to be cut onto said knife under pressure when the tamp is operated depressed from an elevated position.

5. A fruit and vegetable slicer comprising a hollow cylindrical body comprising an upper material receiving casing and a lower cut material receiving casing separably connectible, a closure cap for the upper end of the upper casing, tamp means movable through the cap, an annular flange in the upper end of the lower casing, an annular channel carried by the flange, an annulus adapted to rest upon and rotate relative to the annular channel, teeth on the lower side of the annulus adapted to depend into the annular channel which then acts as a guide and retainer for the annulus, a slotted disk knife secured upon the annulus, and manually operated pinion means extending through the side of the lower casing and operatively engaged with the teeth of the annulus through an opening in the channel for rotating the knife, a flange in the lower end of the upper casing for resting upon the flange in the upper end of the lower casing, and a ridge on the flange of the lower casing with which the radially inward edge of the flange of the upper casing frictionally engages for separably connecting the casings together.

6. A fruit and vegetable slicer comprising a hollow cylindrical body comprising an upper material receiving casing and a lower cut material receiving casing, a horizontal rotary knife carried by the upper end of the lower casing, an inward flange on the lower end of the upper casing, downwardly converging wall means concentrically within the upper casing and resting on the lower end flange of the upper casing, the lower end of the wall means being arranged to closely surround the rotary knife, and tamp means vertically movable in the upper casing and arranged to be closely surrounded by the lower end of the wall means when in depressed position whereby to confine material below the tamp means and force substantially all of the material therebelow into engagement with the rotary knife, said downwardly converging wall means being provided with circumferentially spaced vertically extending inwardly projecting guides, said tamp means comprising circular plate means formed in its edges with notches for slidably receiving the guides, whereby the tamp means is permitted to be vertically reciprocated for tamping the material in the upper casing while being retained against rotation in the upper casing, the wider upper portion of the wall means being sufficiently larger than the tamp means to permit relatively free passage of material between the edges of the tamp means and the wall means and below the tamp means.

In testimony whereof I affix my signature.

VERA VATH.